(12) United States Patent
Boerner et al.

(10) Patent No.: US 7,902,295 B2
(45) Date of Patent: Mar. 8, 2011

(54) SINGLE STEP SYNTHESIS OF FUNCTIONAL MULTI-BLOCK POLYMER

(75) Inventors: Peter W. Boerner, Massillon, OH (US); Daniel Graves, Canal Fulton, OH (US); James E. Hall, Mogadore, OH (US); Brent Iceman, Barberton, OH (US)

(73) Assignee: Firestone Polymers, LLC

( * ) Notice: Subject to any disclaimer, the term of this patent is extended or adjusted under 35 U.S.C. 154(b) by 596 days.

(21) Appl. No.: 11/197,149

(22) Filed: Aug. 3, 2005

(65) Prior Publication Data

US 2006/0030671 A1 Feb. 9, 2006

Related U.S. Application Data

(60) Provisional application No. 60/598,992, filed on Aug. 5, 2004.

(51) Int. Cl.
*C08L 53/02* (2006.01)
*C08F 297/04* (2006.01)

(52) U.S. Cl. ............................. 525/89; 525/259; 525/316

(58) Field of Classification Search .................... 525/89, 525/259, 316

See application file for complete search history.

(56) References Cited

U.S. PATENT DOCUMENTS

| | | | |
|---|---|---|---|
| 3,149,182 A | 9/1964 | Porter | |
| 4,994,508 A * | 2/1991 | Shiraki et al. | 524/14 |
| 5,393,721 A | 2/1995 | Kitamura et al. | |
| 5,610,227 A | 3/1997 | Antkowiak et al. | |
| 5,723,533 A | 3/1998 | Lawson et al. | |
| 5,866,650 A | 2/1999 | Lawson et al. | |
| 6,025,450 A | 2/2000 | Lawson et al. | |
| 6,084,025 A | 7/2000 | Kitamura et al. | |
| 6,575,686 B2 | 6/2003 | Delme et al. | 523/172 |
| 6,576,686 B1 | 6/2003 | Delme et al. | |
| 2002/0132922 A1 | 9/2002 | Delme et al. | |
| 2003/0065053 A1 | 4/2003 | Delme et al. | |
| 2003/0149140 A1 * | 8/2003 | Stephens et al. | 524/59 |
| 2003/0187137 A1 | 10/2003 | Handlin et al. | |

FOREIGN PATENT DOCUMENTS

| | | |
|---|---|---|
| EP | 0 451 603 A | 10/1991 |
| GB | 1 493 675 | 11/1977 |
| WO | WO 00/56796 A | 9/2000 |
| WO | WO 02/00787 A | 1/2002 |
| WO | WO 02/00806 A | 1/2002 |
| WO | WO 03/082943 A | 10/2003 |

OTHER PUBLICATIONS

Adhesive composition for fastening . . . adhesive resin and organic solvent, Lehrbuch Der Analytischen Und Praeparativen Anorganischen Chemie, 1973, pp. 239-240 XP002187097.
International Publication No. WO 00/56796, Sep. 28, 2000, PCT/US00/08012.
International Publication No. WO 02/00787, Jan. 3, 2002, PCT/US01/20289.
European Patent Publication No. 0451603A2, Mar. 26, 1991, Application No. 91104737.1.
European Patent EP 0451603B1, Mar. 26, 1991, Application No. 91104737.1.

* cited by examiner

*Primary Examiner* — Jeffrey C Mullis
(74) *Attorney, Agent, or Firm* — Meredith E. Hooker

(57) ABSTRACT

The inventive composition includes a block copolymer which includes four blocks and has the following block arrangement: B-S-B-S. The two polymer blocks B comprise conjugated diene monomer constitutional units; and the two polymer blocks S comprise vinyl aromatic hydrocarbon monomer constitutional units. The invention also includes methods of making such inventive compositions as well as asphalt compositions and/or thermoplastic elastomers which include such block copolymer.

11 Claims, 1 Drawing Sheet

SINGLE STEP SYNTHESIS OF FUNCTIONAL MULTI-BLOCK POLYMER

This application claims benefit from Provisional Application No. 60/598,992, filed Aug. 5, 2004.

BACKGROUND OF THE INVENTION

1. Field of the Invention

The present invention relates to a novel tetra-block vinyl aromatic hydrocarbon (S)-conjugated diene (B) copolymer and to compositions containing such tetra-block copolymer. More particularly, the present invention relates to a tetra-block styrene ("$S_1$")-butadiene ("$B_1$") copolymer having $B_1$-$S_1$-$B_2$-$S_2$ block copolymer configuration and to compositions containing such tetra-block styrene-butadiene copolymer. The present invention also relates to a novel method of making compositions containing the B-S-B-S block copolymer in a single polymerization step.

2. Technical Background

Preparation of linear block copolymers of vinyl aromatic hydrocarbons and conjugated dienes, such as styrene and butadiene, is known. One of the first developments were linear S-B-S block copolymers made with styrene and butadiene. Several other variations for block copolymer structures and methods of preparation have been found since then.

A number of thermoplastic elastomers such as styrene-butadiene block copolymers, are produced by a multi-step process which includes anionic polymerization. Styrene-butadiene block copolymers may have either a star or a linear configuration. There are generally three different types of linear copolymers produced by anionic polymerization: (1) tapered block; (2) di/tri-block; and (3) random.

Tapered or graded block styrene-butadiene copolymers are typically formed when alkyllithium catalysts, styrene and butadiene are mixed in a batch reactor. Random styrene-butadiene copolymers are typically formed when the anionic polymerization is carried out in a continuous flow reactor.

Thermoplastic elastomers (TPE), such as di-block or tri-block styrene-butadiene copolymers, are typically formed when polymerization is carried out in a semi-batch reactor by sequential addition of monomers. Polymerization of TPE may also be carried out through non-sequential addition of component monomers. Because of the stability of the "living" nature of the allylic lithium end group, butadiene-styrene copolymers of widely different structures and properties can be prepared.

For example, in styrene-butadiene-styrene (S-B-S) tri-block copolymers, the rubbery soft B block is between the two hard S blocks. The arrangement of hard and soft blocks yields commercially useful properties. These copolymers have two phases, two glass transition temperatures and are characterized by high raw green strength, complete solubility and reversible thermoplasticity. S-B-S tri-block copolymers are typically produced by a multi-step process which includes first polymerizing styrene to form the S block followed by polymerizing half of the butadiene to form the half B block. Then a di-functional coupling agent is added to link the living polymer chains and form the tri-block polymer.

One method of producing a S-B-S tri-block copolymer is as follows:
(a) charge the batch reactor with styrene and solvent;
(b) add the n-butyl lithium (BuLi) initiator and allow the styrene to polymerize;
(c) add butadiene and allow the butadiene to polymerize;
(d) add a di-functional coupling agent and allow time for coupling; and
(e) add a terminator to terminate the remaining initiator and live polymer chains.

Prior techniques have taught the process of mixing a diene monomer, such as butadiene, and a mono-vinyl aromatic hydrocarbon monomer with a lithium initiator compound to catalyze the polymerization reaction. For example, one butadiene polymerization process includes the steps of: (1) mixing 1,3 butadiene with lithium amine initiator compounds, optionally in the presence of a modifier, wherein the lithium amine initiator compound is selected from the group consisting of compounds of the formulas R'—N—Li wherein R' is a cyclic amine group having 3 to 18 ring carbon atoms and, together with the nitrogen, a ring of 4 to 19 atoms; (2) effecting polymerization conditions; (3) terminating polymerization with a terminating agent to form a functionalized diene elastomer; (4) compounding the functionalized diene elastomer with an amorphous silica filler, a carbon black filler, or both, and a vulcanization agent; and, (5) effecting vulcanization of the filler, functionalized diene elastomeric compound. Useful polymerization initiators include mixtures of metal amides such as lithium amides, and more particularly including litho-hexamethyleneimine (LiHMI).

Such polymerization may be conducted in an acyclic alkane solvent, such as the various hexanes, heptanes, octanes, mixtures thereof, and the like. Where desired, a modifier, such as a polar modifier, may be added to the polymerization ingredients in order to promote randomization in copolymerization and to control vinyl content. Suitable amounts of modifier range between 0 and 90 or more equivalents per equivalent of lithium. The amount depends on the amount of vinyl desired, the level of styrene employed and the temperature of the polymerization, as well as the nature of the specific polar modifier employed.

The modifier compounds which are commonly used in combination with the anionic polymerization initiators such as lithium amides, are represented by the modifier compounds structural formulas I and II shown in FIGS. 1 and 2 respectively, wherein $R_1$ and $R_2$ independently are hydrogen or an alkyl group and the total number of carbon atoms in —$CR_1R_2$— is between one and nine inclusive; y is an integer of 1 to 5 inclusive, y' is an integer of 3 to 5 inclusive, $R_3'$, $R_3$, $R_4$ and $R_5$ independently are —H or —$C_nRH_{2n+1}$ wherein n=1 to 6. While the modifiers of structural formula I are linear oligomers and the modifiers represented by structural formula II are cyclic oligomers, hereinafter the term oxolanyl modifiers is contemplated to encompass the modifiers of both structural formulas.

Suitable oxolanyl modifiers for use in combination with lithium amide initiators include: bis(2-oxolanyl) methane; 2,2-bis(2-oxolanyl) propane; 1,1-bis(2-oxolanyl) ethane; 2,2-bis(2-oxolanyl) butane; 2,2-bis(5-methyl-2-oxolanyl) propane; 2,2-bis-(3,4,5-trimethyl-2-oxolanyl) propane. These modifier compounds represent a few of the dimer compounds represented by structural formula I and other linear and cyclic oligomer modifiers are apparent from their structural formulas. Other useful modifiers include tetrahydrofuran (THF), dialkyl ethers of mono and oligo alkylene glycols; "crown" ethers; tertiary amines such as tetramethylethylene diamine (TMEDA); linear THF oligomers and the like.

Thermoplastic elastomers made of multi-block styrene-butadiene copolymers have been also developed using lithium amide initiators and suitable modifiers to catalyze styrene and butadiene monomers. Typically the process to manufacture multi-block styrene-butadiene copolymers is a multi-step process. One solution polymerization process for making the multi-block copolymers includes the sequential polymerization of styrene monomers and then of butadiene monomers onto the polymerized styrene blocks. A suitable solvent for the polymerization is cyclohexane. This results in the polymerization of first the styrene and then of the butadiene. In a second embodiment, the styrene monomers and the butadiene monomers are polymerized separately and then the polymer blocks of styrene are coupled to the polymer blocks of butadiene.

An issue with known styrene-butadiene block copolymers is that the copolymer includes an undesirable by-product having the configuration of a thermally coupled $B_1$-$S_1$-$B_2$ block copolymer. This by-product makes the above-block copolymers waxy and reduces the strength of the material.

It is known that polymers can be used to modify the rheological properties of asphalt. Asphalt generally includes asphalt materials, frequently referred to as "bitumen (binder)." Asphalt concretes refers to compositions of aggregates and/or filler materials combined with asphalt. Herein the term "asphalt" shall generally refer to both bitumen and to asphalt concretes. Asphalt compositions includes compositions of asphalt and asphalt modifiers, including polymeric asphalt modifiers.

In general, polymeric asphalt modifiers may be viewed as dispersed systems that create a polymer network but that remain in phase from the original asphalt cement or may be viewed as reacted systems characterized by a chemical reaction between the polymer and the asphalt. STEREON® 210 (available from Firestone Polymers of Akron, Ohio) and Dynasol 1205 (available from Dynasol, of Altamira Tamaulipas, Mexico) are examples of common styrene/conjugated-diene block polymer compositions used commercially as polymeric asphalt modifiers.

SUMMARY OF THE INVENTION

The inventors have discovered a linear tetra-block copolymer possessing a unique balance of properties. In particular, the inventors have discovered a linear tetra-block copolymer including four alternating polymer blocks having the block arrangement of B-S-B-S wherein: (a) the B polymer blocks have conjugated diene monomer constitutional units; and (b) the S polymer blocks have vinyl aromatic hydrocarbon monomer constitutional units.

The inventors have also discovered a method of making the aforementioned linear tetra-block copolymer. The method for preparing the linear tetra-block copolymer includes polymerizing an amount of a vinyl aromatic hydrocarbon monomer and an amount of a conjugated diene monomer in the presence of: (1) an initiator which comprises lithium and an amine, wherein the lithium and the amine may be components of the same compound or individual components of separate compounds, and (2) an amount of a vinyl modifier, wherein the amount of the modifier comprises less than an amount necessary to randomize more than about 50% of the vinyl aromatic hydrocarbon and conjugated diene monomers during the polymerizing. An amount of di-block copolymers having the block arrangement of B-S are coupled head to tail, during the polymerization, to form an amount of the tetra-block copolymers having the block arrangement of B-S-B-S.

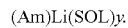

(Am)Li(SOL)y.

Figure 4:
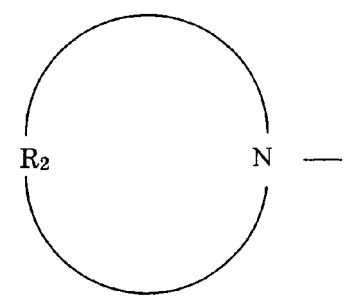

FIG. 4 shows the general formula of a cyclic amine radical of solubilized lithio amines having the general formula (Am)Li(SOL)y.

DETAILED DESCRIPTION OF THE INVENTION

The tetra-block copolymers of the present invention are functionalized linear copolymer compositions prepared by contacting an amount of a vinyl aromatic hydrocarbon monomer "S" and an amount of a conjugated diene monomer "B" to be polymerized with an amount of a functionalized initiator in a hydrocarbon solvent to form an amount of a di-block copolymer having the block arrangement of B-S. Coupling of a plurality of the di-block copolymers occurs during the polymerization to form an amount of a tetra-block copolymer having the block arrangement of B-S-B-S. This type of coupling may be referred to as head to tail coupling in which the vinyl aromatic block of one di-block is coupled to the conjugated diene block of another di-block. In one preferred embodiment, the tetra-block copolymer further comprises an amine on the first B, having the block arrangement (Am)-B-S-B-S.

The functionalized initiator in one embodiment of this invention is a functionalized lithium amine initiator. Suitable lithium amine initiators include solubilized lithio amines having the general formula

(Am)Li(SOL)y where y is from about 0 to about 3. When SOL is not present, y=0, and when SOL is present it is preferred that y=about 0.5 to about 3. The parentheses of this general formula indicate that the formula may include Am—Li—SOLy; SOLy—Am—Li; or, Am—SOLy—Li.

(SOL) is a solubilizing component and may be a hydrocarbon, ether, amine or a mixture thereof. Exemplary (SOL) groups include dienyl or vinyl aromatic polymers or copolymers having a degree of polymerization of from 3 to about 300 polymerization units. Such polymers include polybutadiene, polystyrene, polyisoprene and copolymers thereof. Other examples of (SOL) include polar ligands, such as tetrahydrofuran (THF) and tetramethylethylenediamine (TMEDA).

Figure 1:
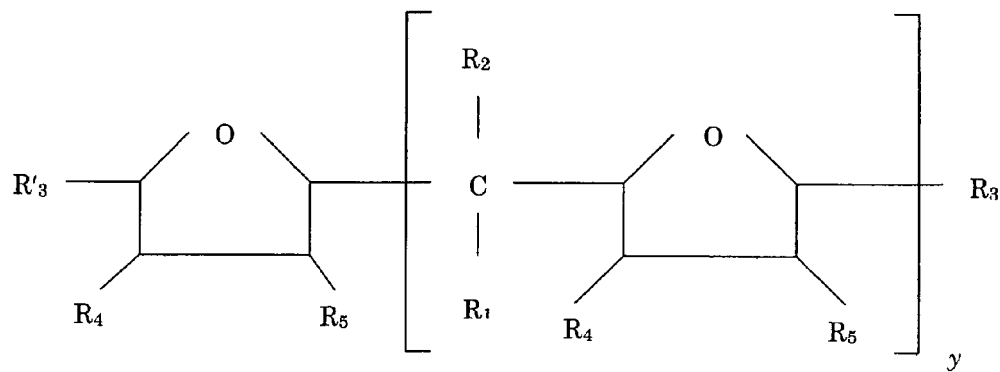
FIG. 1 shows the general chemical structural formulas I of linear oligomer modifiers.
Figure 2:
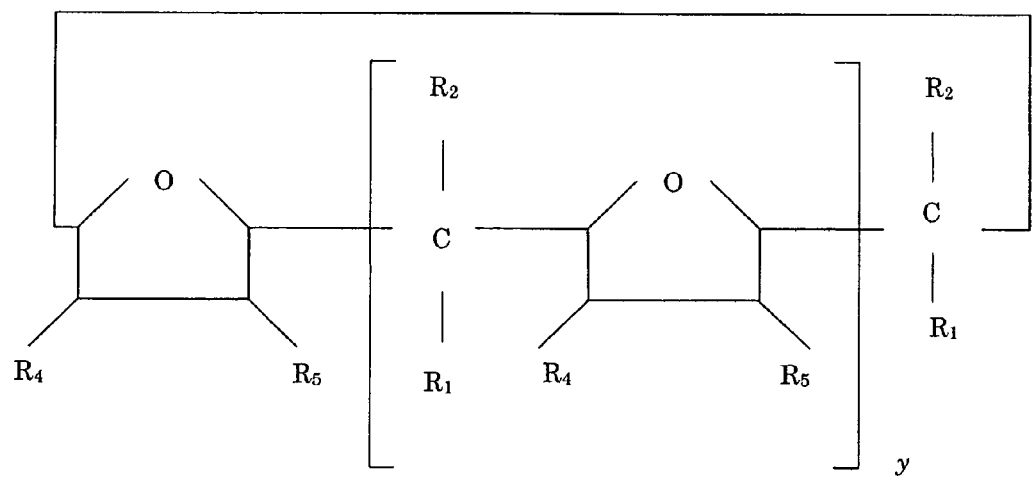
FIG. 2 shows the general chemical structural formulas II of cyclic oligomer modifiers.
Figure 3:
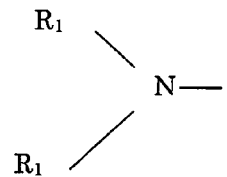
FIG. 3 shows the general formula of an alkyl, dialkyl, cycloalkyl or a dicycloalkyl amine radical of solubilized lithio amines having the general formula

The (Am) component represents the amine functionality, at least one of which is carried by the resulting polymer, such as by being incorporated at the initiation site or head thereof. For example, (Am) may be an alkyl, dialkyl, cycloalkyl or a dicycloalkyl amine radical having the general formula shown in FIG. 3 and cyclic amines having the general formula shown in FIG. 4. In these formulas, each $R_1$ is an alkyl, cycloalkyl or aralkyl having from 1 to about 20 carbon atoms, where both $R_1$ groups may be the same or different (that is, they are independently selected from that group), and $R_2$ is a divalent alkylene, bicycloalkane, oxy- or amino-alkylene group having from about 3 to about 12 methylene groups. Exemplary $R_1$ groups include methyl, ethyl, butyl, octyl, cyclohexyl, 3-phenyl-1-propyl, isobutyl and the like. Exemplary $R_2$ groups include trimethylene, tetramethylene, hexamethylene, oxydiethylene, N-alkylazadiethylene and the like. For example, (Am) may be a derivative of pyrrolidine, that is, $C_4H_8NH$; piperidine such as for example, piperidine and 3-methylpiperidine; 4-alkylpiperazine such as for example, 4-propylpiperazine; perhydroazepine, also known as hexamethyleneimine; or 1-azacyclooctane; including bicyclics such as perhydroisoquinoline, perhydroindole, and the like.

In a preferred embodiment of the present invention, the functionalized lithium amine initiator is lithio-hexamethyleneimine (LiHMI), which optionally, may be formed in-situ in the reaction vessel from a lithium containing compound and an amine containing compound. The invention is not limited to the initiator being formed in-situ.

In one preferred embodiment of the invention, the tetra-block copolymer is made of four blocks having the block arrangement of $B_1$-$S_1$-$B_2$-$S_2$ wherein the $B_1$ and $B_2$ polymer blocks have butadiene monomer constitutional units and the $S_1$ and $S_2$ polymer blocks have styrene monomer constitutional units. Blocks $B_1$ and $B_2$ may be substantially the same or different, likewise blocks $S_1$ and $S_2$ may be substantially the same or different. In one embodiment, blocks $B_1$ and $B_2$ comprise blocks derived from butadiene monomers and each has substantially the same molecular weight and blocks $S_1$ and $S_2$ comprise blocks derived from styrene monomers and each has substantially the same molecular weight.

One aspect of the present invention is to control the molecular weights of the individual blocks of the tetra-block copolymers. This is accomplished by controlling the monomer and the initiator ratios. In preferred embodiments of the present invention, monomer blends having weight ratios of between 25/75 and 75/25 butadiene/styrene are charged into a reactor with a hexane solvent to achieve concentrations of between 12.5 and 25 weight percent monomer blend in hexane. Component reactants of a lithium amine initiator are charged into the reactor along with the hexane/monomer blend. Initiator reactant amount providing between 0.04 and 0.10 grams of butyl lithium per 100 grams of monomer blend generally provides for approximately 100 percent conversion of monomer to polymer.

Randomization is prevented by conducting the polymerization as described above in the absence of sufficient amounts of modifiers whose use may result in randomization of the polymer, such as oxolanyl modifiers used in the prior art. In preferred embodiments of the present invention, an amount of vinyl modifier present comprises less than an effective amount necessary to randomize the polymerization of not more than about 50% of the styrene monomer and butadiene monomer present, preferably less than an effective amount necessary to randomize the polymerization of not more than about 20% of the styrene monomer and butadiene monomer present, and more preferably less than an effective amount necessary to randomize the polymerization of not more than about 5% of the styrene monomer and butadiene monomer present. In preferred embodiments of the present invention, the ratio of vinyl modifiers, such as the aforementioned oxolanyl modifiers, present to monomer present is less than about 70 parts per million ("ppm"). In one particular embodiment, the amount of modifier present comprises at least 1 ppm up to less than about 70 ppm.

The modifier may be a separate compound charged into the reactor, or may be charged into the reactor as part of the initiator. The modifier may be part of the initiator by choosing an SOL that is a polar ligand such as THF or TMEDA.

In one preferred embodiment, the number average molecular weight of the B-S-B-S tetra-block copolymer is between about 50,000 and about 200,000; preferably number average molecular weight of the B-S-B-S tetra-block copolymer is between about 75,000 and about 175,000, and more preferably between about 100,000 and about 150,000. The individual number average molecular weights of the S blocks are each at least about 6,000.

The invention includes a novel single initial charge polymerization process to make the multi-block copolymer. An aspect of the present invention is the method of preparing a tetra-block copolymer having the block arrangement of B-S-B-S. First, a hydrocarbon solvent solution having an amount of a vinyl aromatic hydrocarbon monomer "S" and an amount of a conjugated diene monomers "B" is charged into a reactor vessel or its equivalent. The amounts of S and B may be added to the reactor at the same time. Neither components S or B are required to be metered into the reactor vessel. Second, an amount of a lithium compound and an amount of an amine compound are added to the initial charge of vinyl aromatic hydrocarbon monomers and conjugated diene monomers to form in-situ an amount of a functionalized lithium amine initiator. In the case that the initiator comprises a lithium containing compound and an amine containing compound, the two compounds may be added to the reactor in any order, e.g., the lithium compound first and then the amine compound, the amine compound first and then the lithium compound, or both the lithium compound and the amine compound at the same time.

A plurality of the vinyl aromatic hydrocarbon monomer and a plurality of the conjugated diene monomer are polymerized in the presence of the functionalized lithium amine initiator to form an amount of a di-block copolymer having the block arrangement of B-S. A plurality of the di-block copolymers are coupled during the polymerization to form a tetra-block copolymer having the block arrangement of B-S-B-S.

In one preferred embodiment of the method of the present invention, a tetra-block copolymer having the block arrangement of $B_1$-$S_1$-$B_2$-$S_2$ is prepared. First, a solution having an amount of a styrene monomer and an amount of a butadiene is charged into a reactor vessel or its equivalent. The styrene and the butadiene may be dispersed in a solvent, e.g., hydrocarbon solvent. Examples of suitable solvents include hexane and cyclohexane. Second, an amount of a lithium compound and an amount of an amine compound is added to the initial charge of styrene monomers and butadiene monomers to form in-situ an amount of a functionalized lithium amine initiator. A plurality of the styrene monomers and a plurality of the butadiene monomers are polymerized in the presence of the functionalized lithium amine initiator to form an amount of a di-block copolymer having the block arrangement of $B_1$-$S_1$. A plurality of the di-block copolymers couple to form an amount of a tetra-block copolymer having the block arrangement of $B_1$-$S_1$-$B_2$-$S_2$, wherein the polymer blocks $B_1$ and $B_2$ comprise butadiene monomer constitutional units; and the polymer blocks S comprise styrene monomer constitutional units.

In another preferred embodiment of the method of the present invention, the functionalized lithium amine initiator is lithio-hexamethyleneimine (LiHMI), which can be formed in-situ by admixing an amount of n-butyl lithium (BuLi) and an amount of hexamethyleneimine (HMI) along with the initial charge of butadiene and styrene monomers. Preferably, the amount of hexamethyleneimine is mixed with the generally molar equivalent amount of n-butyl lithium.

In another particular embodiment of the invention, an optional hexane solution having between about 16 weight percent and about 17 weight percent monomers, including an amount of a styrene monomer and amount of a butadiene monomer, is charged into a reactor vessel. The weight ratio of the monomer blend is between 80/20 and 50/50 butadiene/styrene. Preferably, the amount of styrene monomer is generally the molar equivalent of the amount of butadiene monomer. Then an amount of n-butyl lithium (BuLi) and an amount of hexamethyleneimine (HMI) is added to the initial charge of styrene monomers and butadiene monomers to form lithiohexamethyleneimine (LiHMI) in-situ. Alternatively, the LiHMI may be added to the reactor as a single compound. Preferably, the amount of hexamethyleneimine is mixed with the generally molar equivalent amount of n-butyl lithium. The weight ratio of the initiator to monomer blend is between about 0.04 to about 0.10 grams of butyl lithium per 100 grams of monomer blend. Optimally, the weight ratio of the initiator to monomer blend is between about 0.05 to about 0.08 grams of butyl lithium per 100 grams of monomer blend for approximately 100 percent conversion of monomer to polymer.

Where desirable, the anionic polymerization can be terminated by the adding an amount of a suitable terminator such as ethylhexanoic acid, alcohols, water, and mixtures thereof.

Accordingly, one advantage of the present invention is to synthesize new functional tetra-block styrene-butadiene copolymer having the block arrangement of $B_1$-$S_1$-$B_2$-$S_2$ and a functional tetra-block copolymer composition formed from styrene-butadiene copolymers including tetra-block copolymers having the block arrangement of $B_1$-$S_1$-$B_2$-$S_2$. In another certain embodiment, the novel polymer has the advantage of having S-B-S character and TPE properties.

A further advantage of the invention is that the tetra-block copolymer may be formed without metering in either one of the vinyl aromatic hydrocarbon monomer or conjugated monomer into the reaction vessel. Also, the aforementioned polymer may be synthesized with out separate charges of the monomers. Furthermore, the polymer may be produced through a single polymerization step.

Another advantage of the present invention is to synthesize such a tetra-block copolymer having improved thermoplastic elastomeric characteristics, including an enhanced tensile strength in order that such polymer may be used as in asphalt mixtures.

An additional advantage of the present invention is that the initial charge of butadiene and styrene into a reactor vessel may be polymerized into the tetra-block copolymer having the block arrangement of $B_1$-$S_1$-$B_2$-$S_2$ without the use of subsequent reactors. A further advantage of the current invention is that, the LiHMI initiator may be formed in-situ by the reaction of HMI (hexamethyleneimine) with n-butyl lithium (BuLi).

In one embodiment it is opined that the HMI is attached to the butadiene end of the B-S di-block copolymer and that live lithium is attached to the styrene end in the arrangement of HMI-B-S-Li. It is further opined that the live end of the diblock (tail) containing lithium reacts with the Am end of a second di-block to form the tetra-block polymer. Though this is the theory that is believed, this theory should not be viewed as limiting the scope of the invention, and the invention is not bound by this theory. The claims will serve to define the invention.

One embodiment of the polymerization reaction product of an above-identified preferred embodiment of the method of the present invention is a polymeric composition of various block copolymers, including up to about 50 weight percent, preferably about 10 to about 40 weight percent, more preferably about 15 to about 32 weight percent, and even more preferably about 20 to about 30 weight percent of the block copolymer having four blocks having the block arrangement of $B_1$-$S_1$-$B_2$-$S_2$ while optionally, no more than about 5 weight percent is multi block copolymers having the block arrangements of B-S-S-B-(B-S)$_n$, wherein n is an integer equal to or greater than 1. The remainder of the composition, or about 40 to 95 weight percent, preferably about 45 to about 90 weight percent, is composed B-S di-block copolymer.

The vinyl content of the polymerization reaction product can be between about 5 weight percent and about 70 weight percent. Preferably, the vinyl content is between about 6 weight percent and about 30 weight percent. More preferably, the vinyl content is between about 7 weight percent and about 25 weight percent and, more preferably yet, the vinyl content is between about 8 weight percent and about 20 weight percent.

From observing a composition which it includes the head to tail coupled tetra-block copolymer, the composition is thought to have a tensile strength is at least about 500 p.s.i.

The polymerization reaction product of one embodiment of this invention is a polymeric composition of di-block and tetra-block copolymers having a bimodal molecular weight distribution. About 5 to about 50 weight percent of the composition comprises B-S-B-S block copolymers having an average molecular weight of between 105,000 and 200,000, preferentially between 126,000 and 154,000, even more preferentially having an average molecular weight of between 133,000 and 147,000, and most preferentially having an average molecular weight of about 140,000. About 50 to about 95 weight percent of the composition comprises B-S block copolymers having an average molecular weight of between about 50,000 to about 80,000, preferentially between about 63,000 and about 77,000, even more preferentially having an average molecular weight of between about 66,500 and about 73,500, and most preferentially having an average molecular weight of about 70,000.

The polymerization reaction product has significant utility as a primary polymer for modified asphalt, including asphalt roofing systems and asphalt paving systems. In particular embodiments of modified asphalt compositions, the inventive composition may be used in concentration levels of about 10% by weight or less, preferably about 4% or less, more preferably about 3.5% or less, and even more preferably less than about 3%. These polymerization reaction products can be formed into pellet shape and can be readily compounded with appropriate ingredients for use with either high or low shear asphalt mixing equipment. The polymerization reaction product is a high-efficiency styrene butadiene multi-block thermoplastic elastomer that blends easily with polystyrene and polyolefin resins to give alloyed plastic products having improved impact resistance and toughness. In free-flowing pellet form, the polymerization reaction product allows handling in conventional plastics handling systems.

An example of an embodiment of the invention comprises a polymer modified asphalt composition is formed from a mixture of asphalt, aggregate, and polymeric asphalt modifier. The polymeric asphalt modifier comprises a block polymer composition having from about 5 up to about 50 weight percent of the block copolymer consisting of four blocks having the block arrangement of B-S-B-S and about 50 to about 95 weight percent of the block copolymer consisting of two blocks having the block arrangement of B-S. The number average molecular weight of the B-S-B-S tetra-block copolymer is between about 50,000 and about 200,000 and the number average molecular weight of the B-S di-block copolymer is between about 25,000 and about 100,000.

Another example of a polymer modified asphalt composition comprising the inventive copolymer includes an asphalt, an aggregate, and a polymeric asphalt modifier. The polymeric asphalt modifier may comprise form about 5 to up to about 50 weight percent of a block copolymer having four blocks having the block arrangement of B-S-B-S about 50 to about 95 weight percent of a di-block copolymer having the block arrangement of B-S. The polymer blocks B comprise conjugated diene monomer constitutional units; and the polymer blocks S comprise vinyl aromatic hydrocarbon monomer constitutional units. The number average molecular weigh of the di-block may comprises about 25,000 to about 100,000, preferably about 50,000 to about 90,000, more preferably about 60,000 to about 80,000, and even more preferably about 65,000 to about 75,000.

Asphalts employed in this invention can be either a naturally occurring asphalt or a manufactured asphalt produced by refining petroleum. Naturally occurring asphalts suitable for use in this invention include, for example, lake asphalts, rock asphalts and the like. Suitable manufactured asphalts include, for example, straight-run asphalts, propane asphalts, air-blown asphalts, thermal asphalts, blended asphalts and the like.

Another advantage of the present invention is that the polymerization reaction product of one embodiment of this invention, a polymeric composition of di-block and tetra-block copolymers having a bimodal molecular weight distribution, does not require a solvating agent to aid in dispersal of the tetra-block copolymers to create polymer networks within the asphalt cement. The polymeric composition in crumb form can be added to asphalt to form an asphalt composition. Preferably, the temperature and pressures of the mixing process cause the B-S block copolymers to become amorphous and develop solvating characteristics. This process more efficiently reduces the polymeric composition crumb and more efficiently disperses the B-S-B-S block copolymers in a polymer network throughout the original asphalt cement. The resulting asphalt composition has improved performance in both toughness and tenacity.

Another aspect of the invention includes a thermoplastic elastomeric composition comprising up to about 50 weight percent of a block copolymer consisting of four blocks having the block arrangement of $B_1$-$S_1$-$B_2$-$S_2$ wherein: (a) the two polymer blocks $B_1$ and $B_2$ comprise butadiene monomer constitutional units; and (b) the two polymer blocks $S_1$ and $S_2$ comprise styrene monomer constitutional units.

In another aspect, the inventors have discovered a thermoplastic elastomeric composition comprising: (a) up to about 50 weight percent of the block copolymer consisting of four blocks having the block arrangement of $B_1$-$S_1$-$B_2$-$S_2$; (b) less than about 5 weight percent of the multi block copolymers consisting of blocks having the block arrangement of B-S-S-B-(B-S)$_n$; and (c) about 50 to about 95 weight percent of the block copolymer consisting of two blocks having the block arrangement of B-S, wherein: the polymer blocks B, $B_1$ and $B_2$ comprise butadiene monomer constitutional units; the polymer blocks S, $S_1$ and $S_2$ comprise styrene monomer constitutional units; and n is an integer equal to or greater than 1.

The invention has been described with reference to the preferred embodiments. Modifications and alterations will occur to others upon reading and understanding the specification. The invention is intended to include such modifications and alterations insofar as they come within the scope of the disclosure and claims.

In order to demonstrate the practice of the present invention, the following example has been prepared and tested. The example should not, however, be viewed as limiting the scope of the invention. The claims will serve to define the invention.

EXAMPLE

A batch reactor with an agitator was first vented to below 10 psig. 147.9 lbs of hexane were then added to the reactor. The reactor was again vented to below 10 psig. The contents of the reactor were agitated at a rate of about 100 rpm throughout the reaction. The reactor was charged with 258.6 lbs of a 23.2% 1,3 butadiene solution, and 64.1 lbs of a 31.2% styrene solution, and allowed to stabilize at 70° F. The reactor was charged with 1.074 Kg of a 3.4% BuLi catalyst solution. With the reactor temperature stabilized at 70° F., the reactor was charged with 0.385 Kg of a 10% solution of hexamethyleneimine. The temperature of the reactor jacked was then set to 130° F., and the reaction was allowed to proceed for 71 minutes, until 5 minutes after the peak temperature of the reaction mixture was reached. 90.7 g ethylhexanoic acid was then charged to the reactor, and the jacket temperature was lowered to 100° F. The product was found to have the properties listed in Table 1.

TABLE 1

| | |
|---|---|
| % Bound Styrene | 25.4 |
| Tg (C) | −88.80 |
| % Vinyl | 8.2 |
| % trans | 52.2 |
| % cis | 39.6 |
| Total Mn | 80849 |
| Total Mw | 107622 |
| Total Mw/Mn | 1.33 |

Various modifications and alterations that do not depart from the scope and spirit of this invention will become apparent to those skilled in the art. This invention is not to be duly limited to the illustrative embodiments set forth herein.

What is claimed is:

1. A tetra-block copolymer comprising four polymer blocks having a block arrangement of B-S-B-S wherein:
   the two polymer blocks B comprise conjugated diene monomer constitutional units having substantially the same molecular weights: and
   the two polymer blocks S comprise vinyl aromatic hydrocarbon monomer constitutional units, having substantially the same molecular weights, and wherein the tetra-block copolymer further comprises an amine on the B attached to only one S block.

2. The copolymer of claim 1, wherein:
   a number average molecular weight of the B-S-B-S tetra-block copolymer comprises between about 50,000 and about 200,000;
   a number average molecular weight for the S blocks individually comprise at least about 6,000.

3. The copolymer of claim 1 wherein the conjugated diene comprises butadiene and the vinyl aromatic hydrocarbon comprises styrene.

4. A thermoplastic elastomeric composition comprising:
   about 5 to about 50 weight percent, based on a weight of the thermoplastic elastomeric composition, of a block copolymer comprising four blocks having the block arrangement of B-S-B-S wherein:
   the two polymer blocks B comprise conjugated diene monomer constitutional units having substantially the same molecular weights; and
   the two polymer blocks S comprise vinyl aromatic hydrocarbon monomer constitutional units having substantially the same molecular weights, and
   about 50 to about 95 weight percent, based on the weight thermoplastic elastomeric composition, of a di-block copolymer comprising two blocks having the block arrangement of B-S wherein:
   the polymer block B comprises conjugated diene monomer constitutional units; and
   the polymer block S comprises vinyl aromatic hydrocarbon monomer constitutional units.

5. The composition of claim 4, further comprising:
less than about 5 weight percent of multi block copolymers comprising blocks having the block arrangement of B-S-S-B-(B-S)n wherein:
the polymer blocks B comprise conjugated diene monomer constitutional units;
the two polymer blocks S comprise vinyl aromatic hydrocarbon monomer constitutional units; and n comprises an integer equal to or greater than 1.

6. The composition of claim 4, wherein:
a number average molecular weight of the B-S-B-S tetra-block copolymer comprises between about 50,000 and about 200,000;
a number average molecular weight for the S blocks individually comprise at least about 6,000.

7. The composition of claim 4, wherein a vinyl content comprises between about 8 percent and about 70 percent.

8. The composition of claim 4 wherein the polymer blocks B comprise butadiene units and the polymer blocks S comprise styrene units.

9. An asphalt additive comprising the composition of claim 5.

10. The composition of claim 4, comprising a bimodal molecular weight distribution, wherein:
the number average molecular weight of the block arrangement of B-S-B-S comprises between about 105,000 and about 175,000; and
the number average molecular weight of the di-block B-S comprises between about 60,000 and about 85,000.

11. The composition of claim 10, wherein:
the number average molecular weight of the block arrangement of B-S-B-S comprises between about 125,000 and about 150,000; and
the number average molecular weight of the di-block B-S comprises between about 65,000 and about 75,000.

* * * * *